(12) United States Patent
Nakatani

(10) Patent No.: US 10,054,335 B2
(45) Date of Patent: Aug. 21, 2018

(54) SOLAR LIGHT HEAT RECEIVER, AND SOLAR LIGHT COLLECTING AND HEAT RECEIVING SYSTEM

(75) Inventor: Hiromi Nakatani, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 209 days.

(21) Appl. No.: 13/513,081

(22) PCT Filed: Oct. 4, 2010

(86) PCT No.: PCT/JP2010/067358
§ 371 (c)(1),
(2), (4) Date: May 31, 2012

(87) PCT Pub. No.: WO2011/077806
PCT Pub. Date: Jun. 30, 2011

(65) Prior Publication Data
US 2012/0234312 A1    Sep. 20, 2012

(30) Foreign Application Priority Data
Dec. 24, 2009    (JP) .................. 2009-291637

(51) Int. Cl.
*F24J 2/10*    (2006.01)
*F24J 2/46*    (2006.01)
(Continued)

(52) U.S. Cl.
CPC ................ *F24S 10/70* (2018.05); *F03G 6/00* (2013.01); *F24S 20/20* (2018.05); *F24S 40/80* (2018.05);
(Continued)

(58) Field of Classification Search
CPC . Y02E 10/46; F24J 2/205; F24J 2/0483; F24J 2/0494; F24J 2/24; F24J 2/4636; F03G 6/045; F03G 6/00; F22B 1/006
(Continued)

(56) References Cited

U.S. PATENT DOCUMENTS 2,932,091 A * 4/1960 Day .......................... D21F 5/02
165/169
3,004,529 A * 10/1961 Argersinger et al. ...... 122/448.1
(Continued)

FOREIGN PATENT DOCUMENTS

| JP | 51-24434 A | 2/1976 |
| JP | 53-41836 A | 4/1978 |

(Continued)

OTHER PUBLICATIONS

International Search Report of PCT/JP2010/067358, dated Nov. 2, 2010.
Written Opinion of PCT/JP2010/067358, dated Nov. 2, 2010.

*Primary Examiner* — Steven B McAllister
*Assistant Examiner* — Steven Anderson, II
(74) *Attorney, Agent, or Firm* — Westerman, Hattori, Daniels & Adrian, LLP

(57) ABSTRACT

Disclosed is a solar light heat receiver having a heat receiving tube which allows a heat medium to flow through the inside thereof and which transmits the heat of irradiated solar light to the heat medium, the solar light heat receiver being provided with a partition member which divides the inside of the heat receiving tube into a first passage on the light receiving surface side to be irradiated with solar light, and a second passage on the non-light receiving surface side opposite to the first passage in the irradiation direction of solar light.

8 Claims, 12 Drawing Sheets

(51) Int. Cl.
  *F24J 2/24* (2006.01)
  *F24S 10/70* (2018.01)
  *F03G 6/00* (2006.01)
  *F24S 40/80* (2018.01)
  *F24S 20/20* (2018.01)

(52) U.S. Cl.
  CPC .............. *Y02E 10/41* (2013.01); *Y02E 10/44* (2013.01); *Y02E 10/46* (2013.01)

(58) Field of Classification Search
  USPC ................. 126/651–677, 703; 60/641.15
  See application file for complete search history.

(56) References Cited

U.S. PATENT DOCUMENTS

| | | | | |
|---|---|---|---|---|
| 3,053,512 | A * | 9/1962 | Soudan et al. | F28D 7/005 165/109.1 |
| 3,399,656 | A * | 9/1968 | Strohmeyer, Jr. | 122/406.4 |
| 3,847,750 | A * | 11/1974 | Ridgway, Jr. | B01F 3/04531 435/244 |
| 4,068,652 | A * | 1/1978 | Worthington | 126/603 |
| 4,156,420 | A * | 5/1979 | Gunderson | 126/655 |
| 4,198,956 | A * | 4/1980 | Soleau, Jr. | 126/668 |
| 4,273,104 | A * | 6/1981 | Uroshevich | 126/652 |
| 4,284,068 | A * | 8/1981 | Gunderson | 126/655 |
| 4,289,114 | A * | 9/1981 | Zadiraka | F22G 5/12 122/487 |
| 4,299,200 | A * | 11/1981 | Spencer | 126/584 |
| 4,473,066 | A * | 9/1984 | Clark | 126/675 |
| 4,505,260 | A * | 3/1985 | Metzger | 126/637 |
| 4,546,758 | A * | 10/1985 | Ebernard | 126/635 |
| 5,572,987 | A * | 11/1996 | Moratalla et al. | 126/652 |
| 6,254,734 | B1 * | 7/2001 | Sephton | B01D 1/065 159/2.3 |
| 6,598,601 | B2 * | 7/2003 | Schutz | 126/655 |
| 6,619,283 | B2 * | 9/2003 | Ghela | 126/692 |
| 6,931,851 | B2 * | 8/2005 | Litwin | F24J 2/07 60/641.11 |
| 6,957,630 | B1 * | 10/2005 | Mastronarde | 122/406.4 |
| 2003/0047180 | A1 * | 3/2003 | Smith et al. | 126/657 |
| 2009/0241939 | A1 * | 10/2009 | Heap | F22B 1/006 126/645 |
| 2010/0206298 | A1 * | 8/2010 | Karni | F03G 6/06 126/651 |
| 2011/0203573 | A1 * | 8/2011 | Hollis | F24J 2/07 126/595 |

FOREIGN PATENT DOCUMENTS

| | | |
|---|---|---|
| JP | 56-105250 A | 8/1981 |
| JP | 61-107051 A | 5/1986 |
| JP | 63-243463 A | 10/1988 |

* cited by examiner

SOLAR LIGHT HEAT RECEIVER, AND SOLAR LIGHT COLLECTING AND HEAT RECEIVING SYSTEM

TECHNICAL FIELD

The present invention relates to a sunlight collecting heat receiver and a sunlight collecting heat receiving system which receive sunlight, convert the sunlight into high-temperature thermal energy, and transfer the thermal energy to a heat medium through a heat transfer.

Priority is claimed on Japanese Patent Application No. 2009-291637, filed on Dec. 24, 2009, the content of which is incorporated herein by reference.

BACKGROUND ART

In recent years, as clean energy which does not affect the environment, an apparatus which uses thermal energy obtained by collecting sunlight is known. As such an apparatus, a sunlight collecting heat receiving system (hereinafter, referred to as a light collecting heat receiving system) has been developed which generates electric power by converting thermal energy into electric energy by collecting sunlight.

In the above-described light collecting heat receiving system, a tower light collecting type is known as one type which collects sunlight.

In the tower light collecting type, a light collecting heat receiver is disposed at a top portion of a tower portion built on a ground, a plurality of heliostats, which is controlled so as to track the sunlight, is disposed around the tower portion, and the sunlight reflected by the heliostats are guided to the light collecting heat receiver, thereby collecting light and heat.

FIG. 15 is a cross-sectional view showing a light collecting heat receiver of the related art when seen from the axial direction of a casing.

As shown in FIG. 15, a light collecting heat receiver 500 of the related art is installed at a top portion of a tower portion (not shown), and includes a bottomed cylindrical casing 502 and a plurality of heat receiving pipes 503. The casing 502 includes an opening portion 501 to which sunlight reflected by the heliostats are incident. The plurality of heat receiving pipes 503 is arranged along the inner wall surface of the casing 502 so that the axial direction thereof is parallel to the center axis of the casing 502, and receives the sunlight incident into the casing 502.

However, in the above-described light collecting heat receiver 500, there is a problem in that a large temperature difference occurs in the circumferential direction (the outer peripheral surface) of each heat receiving pipe 503. Specifically, sunlight H' reflected from the heliostats are incident from the opening portion 501 into the casing 502, and travel from the opening portion 501 toward the inner periphery of the casing 502. For this reason, the front surface of the heat receiving pipe 503 in the irradiation direction of the sunlight H' (the surface, which faces the inside in the radial direction of the casing 502, in the outer peripheral surface of the heat receiving pipe 503) becomes a light receiving surface 503a which can directly receive the sunlight H', and the rear surface in the irradiation direction of the sunlight H' (the surface, which faces the outside in the radial direction of the casing 502, in the outer peripheral surface of the heat receiving pipe 503) becomes a non-light receiving surface 503b which cannot directly receive the sunlight H'. As a result, since thermal energy may not be efficiently obtained from the sunlight H' in the non-light receiving surface 503b, there is a problem in that the temperature difference between the light receiving surface 503a and the non-light receiving surface 503b increases.

In this case, thermal stress is generated by the temperature difference between the light receiving surface 503a and the non-light receiving surface 503b. Accordingly, the heat receiving pipe 503 is deformed, which leads to concern that a concentration of stress may be generated in the heat receiving pipe 503 or a connection portion with a header (not shown) integrating the plurality of heat receiving pipes 503. Further, as for the sunlight H', the amount of solar radiation changes depending on the cycles of day and night, the climate, or the like, the temperature of the heat receiving pipe 503 may change due to the influence of a change in the amount of solar radiation. Then, since the deformation of the heat receiving pipe 503 is repeated by the thermal stress whenever the temperature changes, there is concern that the fatigue life may be reduced.

Therefore, for example, Patent Document 1 discloses a configuration in which a support body is inserted so as to come into contact with a light receiving surface and a non-light receiving surface of a heat receiving pipe in order to reinforce the heat receiving pipe and improve heat transfer between the light receiving surface and the non-light receiving surface.

PRIOR ART DOCUMENTS

Patent Documents

[Patent Document 1] Japanese Unexamined Patent Application, First Publication No. S56-105250

SUMMARY OF INVENTION

Problem to be Solved by the Invention

However, when the heat is transferred between the light receiving surface and the non-light receiving surface only by the support body installed inside the heat receiving pipe like the configuration of Patent Document 1, it is difficult to sufficiently reduce the temperature difference between the light receiving surface and the non-light receiving surface, and large thermal stress is still exerted on the heat receiving pipe. As a result, there is a problem in that the durability of the heat receiving pipe 503 is degraded due to the concentration of stress or the reduced fatigue life as described above.

Therefore, the invention is made in view of the above-described circumstances, and it is an object of the invention to provide a sunlight collecting heat receiver and a sunlight collecting heat receiving system capable of improving the durability of the heat receiving pipe by reducing the temperature difference between the light receiving surface (the irradiation side) and the non-light receiving surface (the non-irradiation side) in the heat receiving pipe.

Means for Solving the Problem

In order to solve the above-described problem, as a sunlight collecting heat receiver of the invention, a sunlight collecting heat receiver includes: a heat receiving pipe into which a heat medium flows and which transfers irradiated sunlight heat to the heat medium; and a partition member which divides the inside of the heat receiving pipe into a first passageway near a light receiving surface (an irradiation side) irradiated with the sunlight and a second passageway near a non-light receiving surface (a non-irradiation side) as the opposite side of the first passageway in the irradiation direction of the sunlight.

Then, according to the sunlight collecting heat receiver with such a configuration, since the heat receiving pipe in which the heat medium flows is divided into the first passageway near the light receiving surface (the irradiation side) of the sunlight and the second passageway near the non-light receiving surface (the non-irradiation side), it is possible to set the respective flow conditions of the heat medium in the first passageway and the second passageway.

In this case, for example, when the flow rate of the heat medium flowing inside the first passageway is larger than the flow rate of the heat medium flowing inside the second passageway, the efficiency of the heat transfer from the first passageway to the heat medium becomes higher than the efficiency of the heat transfer from the second passageway to the heat medium. That is, when the heat transfer from the first passageway to the heat medium is more actively performed than the heat transfer from the second passageway to the heat medium, it is possible to suppress a decrease in temperature of the second passageway due to the heat transfer to the heat medium compared to a decrease in temperature of the first passageway. Accordingly, since it is possible to reduce the temperature difference between the light receiving surface (the irradiation side) and the non-light receiving surface (the non-irradiation side) of the sunlight, it is possible to reduce thermal stress caused by the temperature difference therebetween. As a result, since it is possible to suppress a reduction in fatigue life due to the concentration or the repetition of stress, it is possible to improve the durability of the heat receiving pipe.

The sunlight collecting heat receiver of the invention may further include constraint means for constraining the heat medium from flowing into the second passageway.

In this case, when the flow rate of the heat medium flowing into the second passageway is constrained by the constraint means, it is possible to make the flow rate of the heat medium flowing inside the first passageway be larger than the flow rate of the heat medium flowing inside the second passageway. As a result, as described above, the efficiency of the heat transfer from the first passageway to the heat medium may be made to be higher than the efficiency of the heat transfer from the second passageway to the heat medium. As a result, as described above, the temperature difference between the light receiving surface (the irradiation side) and the non-light receiving surface (the non-irradiation side) may be reduced.

The sunlight collecting heat receiver of the invention may further include a plurality of the heat receiving pipes; and a heat medium introduction header to which the upstream ends of the plurality of heat receiving pipes in the heat medium flowing direction are connected and which introduces the heat medium toward the plurality of heat receiving pipes. The heat medium introduction header may include a first header which communicates with the first passageway of the heat receiving pipe, and a second header which communicates with the second passageway of the heat receiving pipe, and the constraint means may be provided in the second header.

In this case, when the heat medium introduction header is divided into a first header and a second header and the second header is provided with the constraint means, it is possible to simultaneously constrain the flow rates of the second passageways of the plurality of heat receiving pipes. Accordingly, as described above, the efficiency of the heat transfer from the first passageway to the heat medium may be made higher than the efficiency of the heat transfer from the second passageway to the heat medium. As a result, as described above, the temperature difference between the light receiving surface (the irradiation side) and the non-light receiving surface (the non-irradiation side) may be reduced.

In the sunlight collecting heat receiver of the invention, the first passageway and the second passageway may communicate with each other in one end of the heat medium flowing direction. The heat medium may be supplied from the other end of the first passageway in the flowing direction and be discharged from the other end of the second passageway in the flowing direction.

In this case, since the heat medium flows into the first passageway and is discharged from the second passageway, a comparatively low-temperature heat medium flows inside the first passageway and a comparatively high-temperature heat medium subjected to the heat exchange at the first passageway flows inside the second passageway. That is, the temperature difference between the heat medium flowing inside the first passageway and the first passageway becomes larger than the temperature difference between the heat medium flowing inside the second passageway and the second passageway. For this reason, since the heat transfer from the first passageway to the heat medium is more actively performed than the heat transfer from the second passageway to the heat medium, a decrease in temperature of the second passageway due to the heat transfer to the heat medium may be suppressed compared to a decrease in temperature of the first passageway. As a result, the temperature difference between the light receiving surface (the irradiation side) and the non-light receiving surface (the non-irradiation side) may be reduced.

The sunlight collecting heat receiver of the invention may further include a plurality of the heat receiving pipes; a heat medium introduction header to which the other ends of the first passageways of the plurality of heat receiving pipes in the flowing direction are connected and which introduces the heat medium toward the respective first passageways; and a heat medium removal header to which the other ends of the second passageways in the flowing direction are connected and which derives the heat medium from the respective second passageways.

In this case, since only the other end of the heat receiving pipe is connected to the heat medium introduction header and the heat medium removal header, one end thereof is formed as a free end. For this reason, even when the heat receiving pipe is deformed by a change in temperature, the deformation is permitted, so that the thermal stress exerted on the heat receiving pipe may be reduced.

A sunlight collecting heat receiving system of the invention includes: a plurality of reflection mirrors which is installed on a ground and reflects sunlight; a tower portion which is built on the ground; a casing which is supported by the tower portion and has an opening portion used for collecting the sunlight; and the sunlight collecting heat receiver of the invention which is accommodated inside the casing.

In the sunlight collecting heat receiving system with such a configuration, since the sunlight collecting heat receiver of the invention is provided, it is possible to reduce the temperature difference between the light receiving surface (the irradiation side) and the non-light receiving surface (the non-irradiation side) and efficiently transfer the thermal energy from the sunlight to the heat medium.

Effect of the Invention

In the sunlight collecting heat receiver of the invention, it is possible to improve the durability of the heat receiving pipe by reducing the temperature difference between the light receiving surface (the irradiation side) and the non-light receiving surface (the non-irradiation side) in the heat receiving pipe.

Further, in the sunlight collecting heat receiving system of the invention, since the sunlight collecting heat receiver of the invention is provided, it is possible to reduce the temperature difference between the light receiving surface (the irradiation side) and the non-light receiving surface (the non-irradiation side) and efficiently transfer the thermal energy from the sunlight to the heat medium.

EMBODIMENTS OF THE DRAWINGS

MODE FOR CARRYING OUT THE INVENTION

Next, embodiments of the invention will be described based on the drawings. In the description below, solar power generating equipment (hereinafter, referred to as power generating equipment) in which a sunlight collecting heat receiver of the invention is integrated with a power generating unit generating electric power using a heat medium heated by the sunlight collecting heat receiver will be described as an example.

(Power Generating Equipment)

Figure 1:
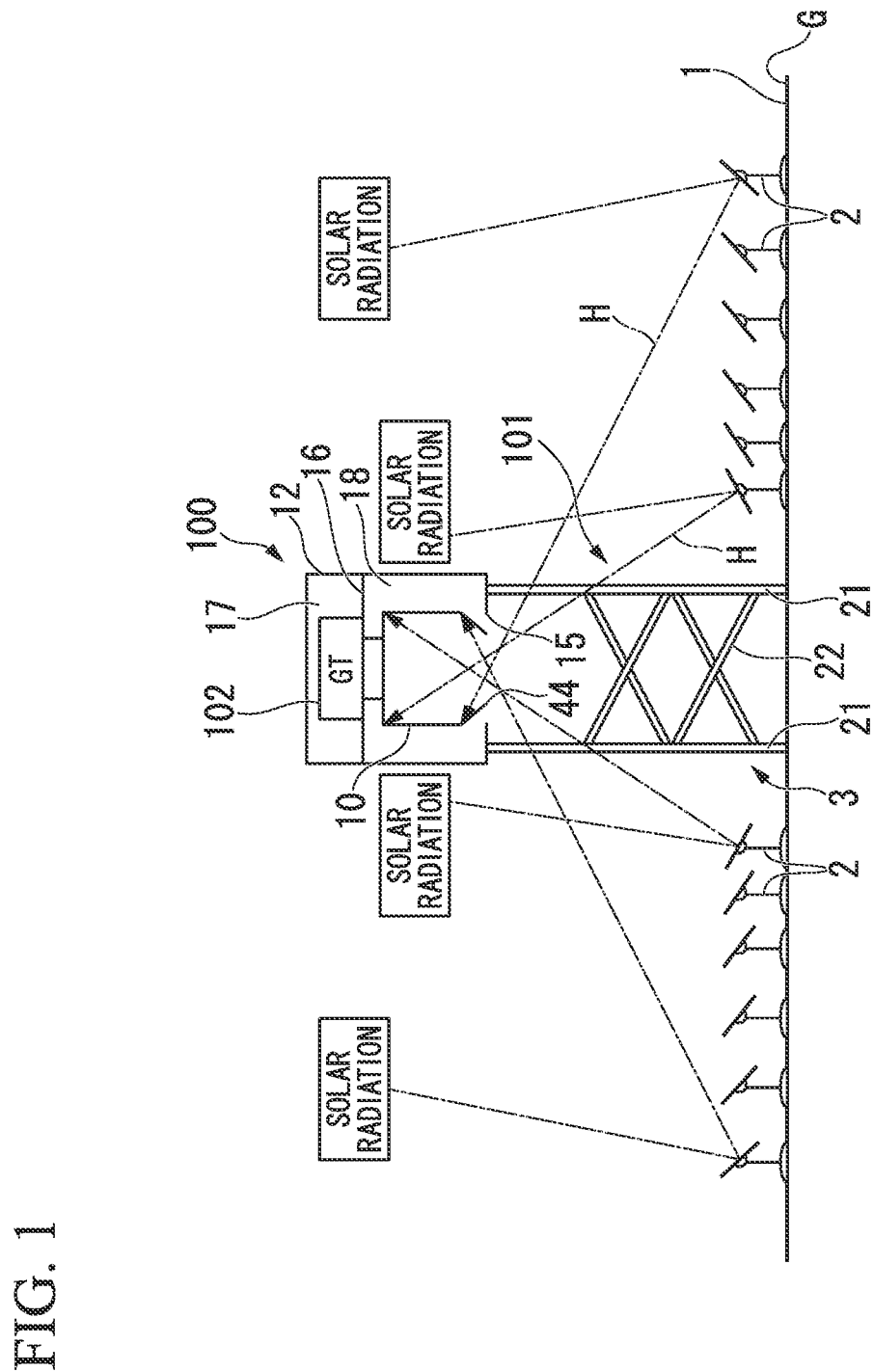
FIG. 1 is a diagram showing power generating equipment of an embodiment when seen from the side thereof.
Figure 2:
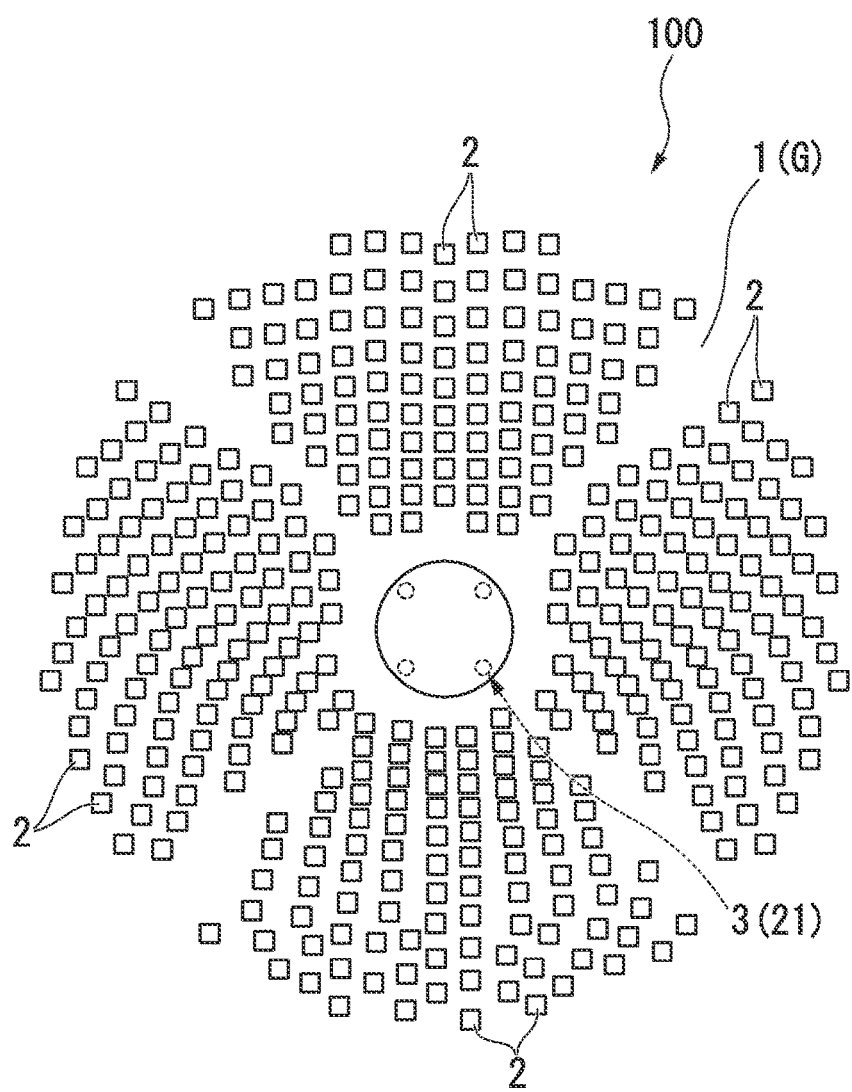
FIG. 2 is a diagram showing the power generating equipment of the embodiment when seen from the upside thereof.

FIGS. 1 and 2 are diagrams illustrating a positional relationship between heliostats and a light collecting heat receiver on a tower, where FIG. 1 is a side view and FIG. 2 is a plan view. Furthermore, a good location for the power generating equipment is an arid area at a subtropical high-pressure belt which is close to a tropic where direct solar radiation from the sun is strong and satisfactory. Therefore, in the power generating equipment of the embodiment, power generating equipment of an entire circumference arrangement type particularly disposed at a low-latitude region in the subtropical high-pressure belt will be described.

In FIG. 1, the reference sign 1 denotes a heliostat field which is provided on a ground G. Power generating equipment 100 includes a light collecting heat receiving system 101 which collects sunlight H irradiated to the heliostat field 1 and receives heat thereof and a power generating unit 102 which generates electric power by using a heat medium heated by the heat received in the light collecting heat receiving system 101.

(Light Collecting Heat Receiving System)

The light collecting heat receiving system 101 includes a plurality of heliostats 2 which is arranged on the heliostat field 1 and reflects the sunlight H, a tower portion 3 which is built on the ground G, a housing 12 which is installed on the top portion of the tower portion 3, and a light collecting heat receiver 10 which is accommodated inside the housing 12 and receives the sunlight H. Here, in the embodiment, the tower portion 3 is disposed at the approximate center of the heliostat field 1. That is, the heliostats 2 inside the heliostat field 1 are disposed so as to surround the tower portion 3 in the entire circumference by about 360° (see FIG. 2).

The housing 12 is formed in a bottomed cylindrical shape so that the axial direction is aligned with the perpendicular direction. The upper surface of the housing 12 is closed, and the center portion of the lower surface in the radial direction is provided with an opening portion 15 which is opened toward the ground G. Further, a partition plate 16 is provided inside the housing 12 so as to divide the housing into upper and lower portions in the axial direction. The upper space divided by the partition plate 16 is formed as a turbine generator chamber 17 where the power generating unit 102 is disposed and the lower space is formed as a light collecting chamber 18 where the light collecting heat receiver 10 is disposed.

The tower portion 3 includes a plurality of (for example, four) columns 21 which is built from the ground G toward the lower surface of the housing 12 and joists 22 which are connected across the columns 21.

(Power Generating Unit)

Figure 3A:
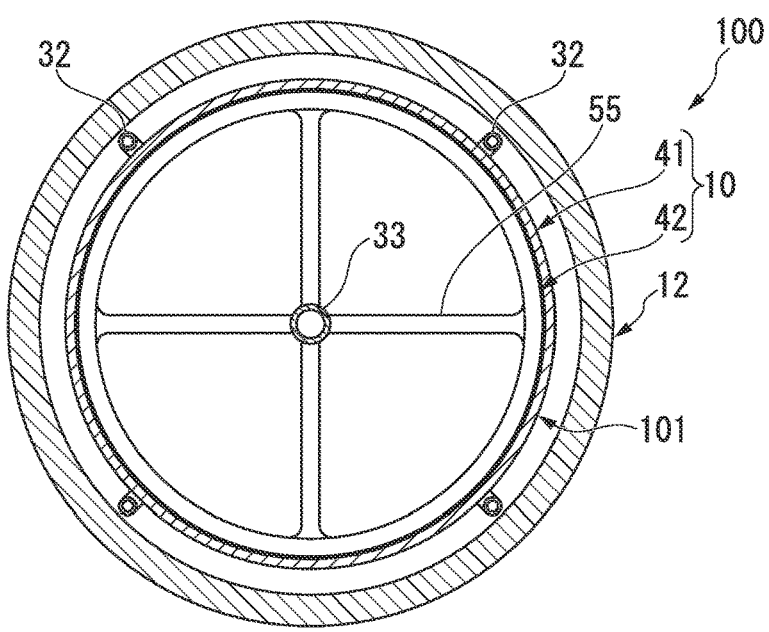
FIG. 3A is a cross-sectional view showing the power generating equipment of the embodiment when seen from the upside thereof.
Figure 3B:
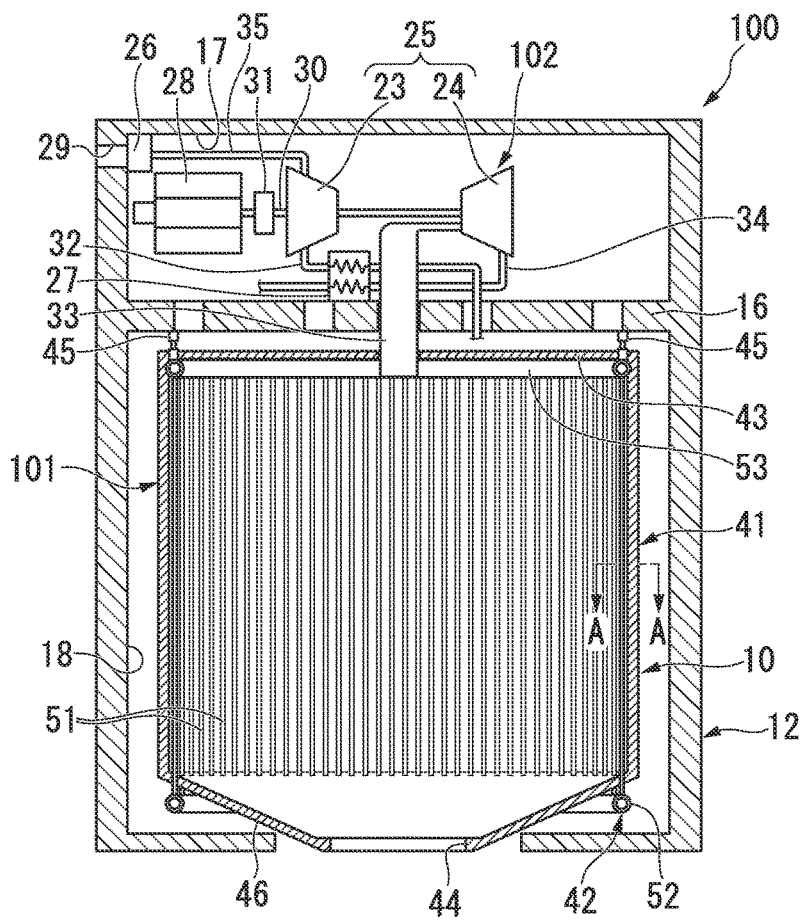
FIG. 3B is a cross-sectional view showing the power generating equipment of the embodiment when seen from the side thereof.

FIG. 3A is a cross-sectional view showing the power generating equipment from the upside thereof, and FIG. 3B is a cross-sectional view from the side thereof.

As shown in FIG. 3B, the power generating unit 102 mainly includes a gas turbine 25 which is accommodated inside the turbine generator chamber 17 of the housing 12 and includes a compressor 23 and a turbine 24, an air intake filter 26, a regenerative heat exchanger 27, and a generator 28.

The gas turbine 25 includes a rotatable rotor 30 which is connected to the generator 28 through a speed reducer 31, and the compressor 23 and the turbine 24 are attached so as to be coaxially disposed with respect to the rotor 30.

The compressor 23 generates compressed air by taking air, which is supplied through an air supply path 35 from a supply source (not shown) provided outside the housing 12, as a working fluid from an air intake port 29 of the housing 12. The compressor 23 is connected with a heat receiver supply path 32 in which the compressed air which is compressed in the compressor 23 flows toward the upstream end of the light collecting heat receiver 10 (see FIG. 4). Then, the compressed air, which is heated in the light collecting heat receiver 10, is supplied to the turbine 24 through a turbine supply path 33 which is connected to the downstream end of the light collecting heat receiver 10 (see the arrow F2 of FIG. 4).

The turbine 24 generates a driving force by converting the thermal energy of the compressed air supplied from the turbine supply path 33 into rotation energy of the rotor 30. Then, the driving force is output to the generator 28 connected to the rotor 30, thereby generating electric power. Then, the compressed air flowing inside the turbine 24 is discharged from the turbine 24 through an air discharge path 34 in the form of an exhaust gas.

The air intake filter 26 is disposed between the supply source on the air supply path 35 and the compressor 23, and removes dust or the like, which is contained in the air supplied from the supply source, in the front stage where the air is supplied to the compressor 23.

Further, the regenerative heat exchanger 27 is connected with the heat receiver supply path 32 and the air discharge path 34. In the regenerative heat exchanger 27, a heat exchange is performed between the compressed air flowing inside the heat receiver supply path 32 and the exhaust gas flowing inside the air discharge path 34. Accordingly, the compressed air flowing inside the heat receiver supply path 32 is pre-heated at the front stage where the compressed air is supplied to the light collecting heat receiver 10.

(Light Collecting Heat Receiver)

Figure 4:
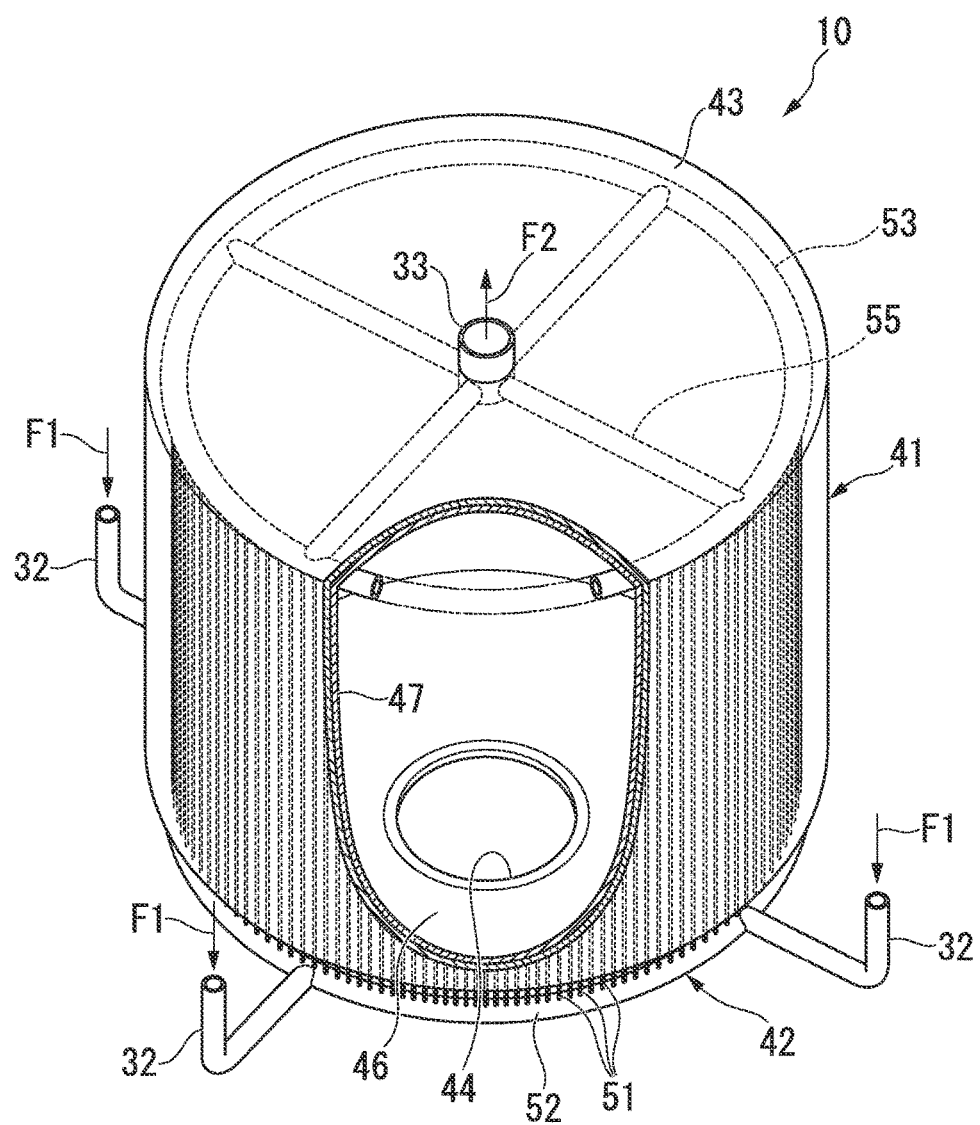
FIG. 4 is a partially cutaway perspective view showing the light collecting heat receiver of the embodiment.

FIG. 4 is a partially cutaway perspective view showing the light collecting heat receiver.

As shown in FIGS. 3A, 3B, and 4, the light collecting heat receiver 10 is accommodated in the light collecting chamber 18 of the housing 12, and includes a heat receiver body 41 which is formed as a casing and a heat receiving unit 42 which is provided inside the heat receiver body 41 and receives heat through the irradiation of the sunlight H reflected in the heliostat 2.

The heat receiver body 41 is formed in a bottomed cylindrical shape in which the axial direction is aligned with the axial direction of the housing 12. The upper portion of the heat receiver body 41 is closed by a ceiling plate portion 43, and the lower portion is provided with an opening portion 44 which is opened toward the ground G. Then, the ceiling plate portion 43 of the heat receiver body 41 is connected to the partition plate 16 by a plurality of hook members 45 (see FIG. 3B), and the heat receiver body 41 is accommodated inside the light collecting chamber 18 while being hung on the partition plate 16 through the hook members 45. Furthermore, although it will be described later, the lower end of each hook member 45 penetrates the heat receiver body 41 and is also connected to the heat receiving unit 42. That is, the heat receiver body 41 and the heat receiving unit 42 of the light collecting heat receiver 10 are both supported by the same hook member 45.

The cross-sectional position of the opening portion 44 of the heat receiver body 41 is disposed at the same position in the direction perpendicular to the lower surface of the housing 12, and the sunlight H reflected in the heliostats 2 are received from the opening portion 44 into the heat receiver body 41. Further, the lower portion of the heat receiver body 41 is provided with a tapered portion 46 of which the inner diameter gradually decreases toward the opening portion 44 (downward).

Further, a heat insulating material 47 (see FIG. 4) is attached to the entire area of the inner wall surface of the heat receiver body 41. Accordingly, it is possible to suppress that the thermal energy inside the heat receiver body 41 is radiated outward from the wall surface of the heat receiver body 41.

Figure 5:
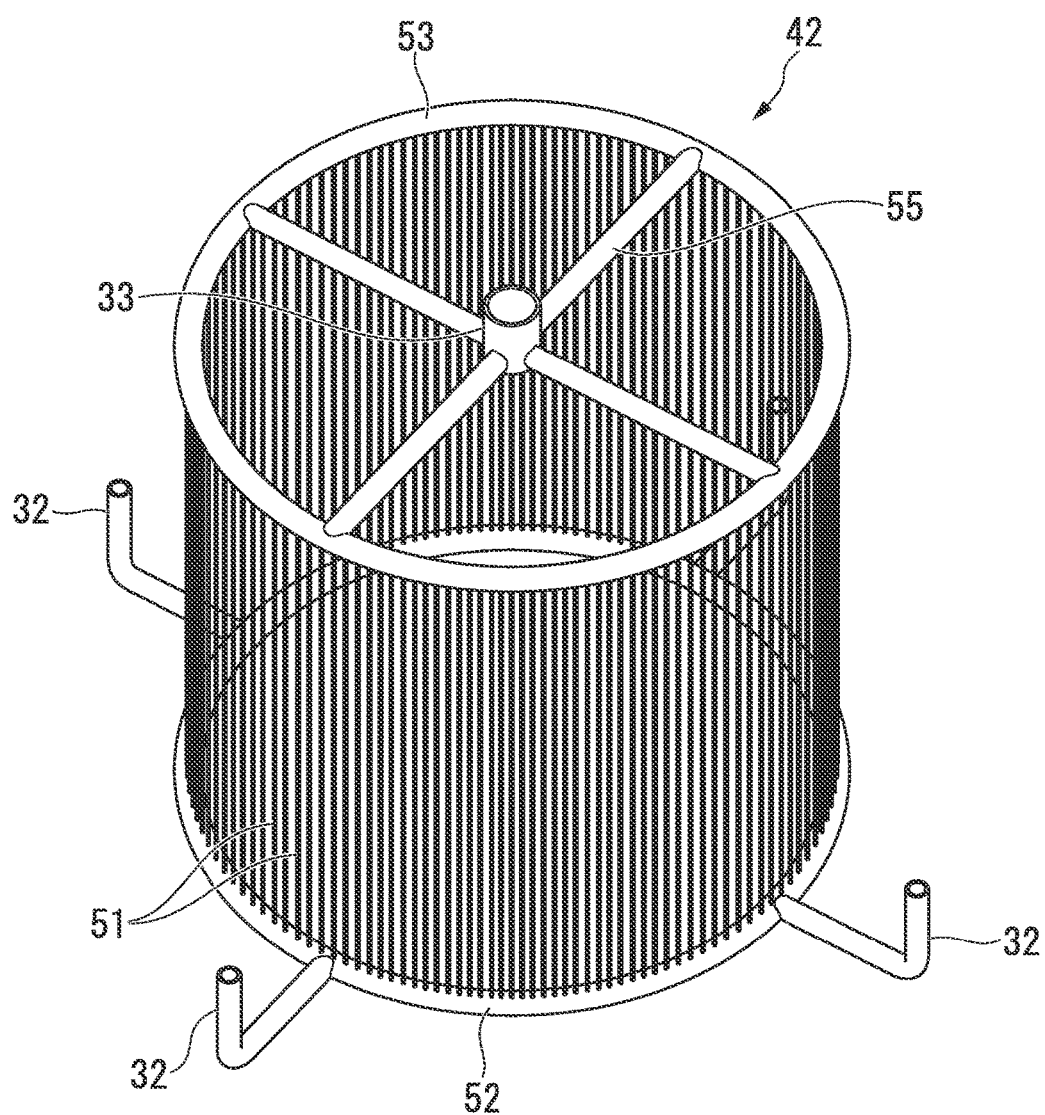
FIG. 5 is a perspective view of a heat receiving unit of the embodiment.

FIG. 5 is a perspective view of the heat receiving unit.

As shown in FIGS. 3A to 5, the heat receiving unit 42 includes a plurality of heat receiving pipes 51, a low-temperature header (a heat medium introduction header) 52 to which the upstream ends of the plurality of heat receiving pipes 51 in the flowing direction of the compressed air are integrally connected, and a high-temperature header (a heat medium removal header) 53 to which the downstream ends of the plurality of heat receiving pipes 51 in the flowing direction of the compressed air are integrally connected.

The low-temperature header 52 is an annular member which is disposed so as to surround the tapered portion 46 of the heat receiver body 41, and the outer peripheral surface thereof is provided with a plurality of heat receiver supply paths 32 which connects the compressor 23 and the heat receiving unit 42 to each other. The heat receiver supply paths 32 are arranged at the same interval in the circumferential direction of the low-temperature header 52, and the compressed air supplied from the heat receiver supply paths 32 into the low-temperature header 52 goes around the entire area of the low-temperature header 52. In this way, since the low-temperature header 52 is disposed outside the heat receiver body 41, a material with high heat resistance does not need to be used as the material of the low-temperature header 52. For this reason, it is possible to reduce the cost of the device.

The high-temperature header 53 is an annular member which is disposed along the outer periphery of the ceiling plate portion 43 inside the heat receiver body 41. The inner periphery of the high-temperature header 53 is provided with a plurality of (for example, four) outflow pipes 55 which is arranged at the same interval in the circumferential direction so as to extend toward the center in the radial direction. The outflow pipes 55 are integrated at the center of the high-temperature header 53 in the radial direction, so that they constitute the turbine supply path 33. Then, the turbine supply path 33 extends to the turbine generator chamber 17 while penetrating the ceiling plate portion 43 and the partition plate 16 in the perpendicular direction and is connected to the turbine 24 at the downstream end. Furthermore, the above-described plurality of hook members 45 are connected to the high-temperature header 53, so that the heat receiving unit 42 is supported while being hung on the partition plate 16.

Figure 6:
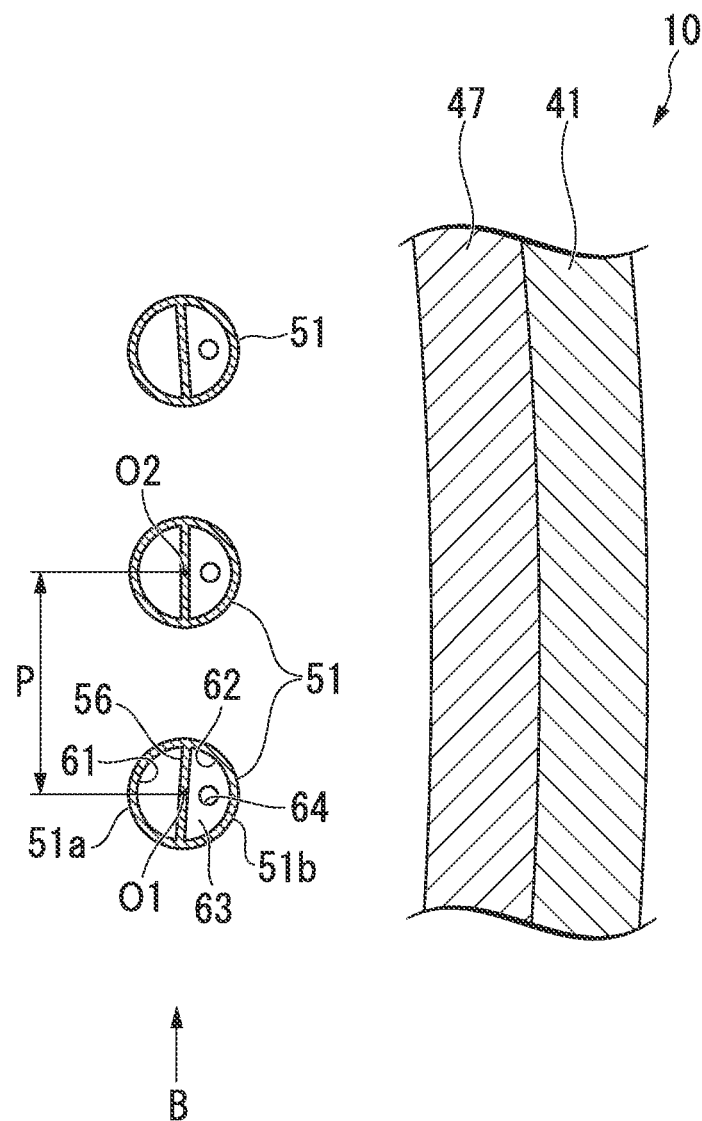
FIG. 6 is a cross-sectional view taken along the line A-A of FIG. 3B.
Figure 7:
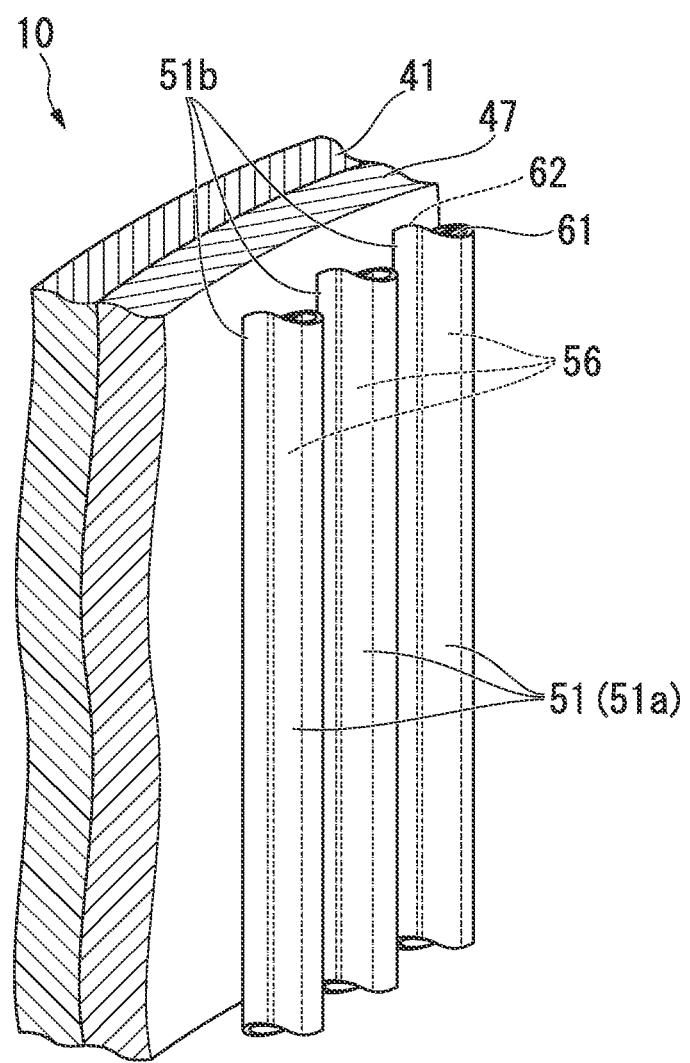
FIG. 7 is a perspective view when seen from the arrow B of FIG. 6.

FIG. 6 is a cross-sectional view taken along the line A-A of FIG. 3B, and FIG. 7 is a perspective view when seen from the arrow B of FIG. 6.

As shown in FIGS. 4 to 7, the heat receiving pipe 51 is a member which is disposed so that the axial direction is parallel to the axial direction of the heat receiver body 41, and a plurality of the heat receiving pipes is arranged in the entire area of the inner wall of the heat receiver body 41 in the circumferential direction. The lower end (the upstream end) of each heat receiving pipe 51 is connected to the upper portion of the low-temperature header 52 while penetrating the tapered portion 46, and the upper end (the downstream end) is connected to the lower portion of the high-temperature header 53 inside the heat receiver body 41. That is, the compressed air flowing inside the low-temperature header 52 is dispersed inside each heat receiving pipe 51, is heated inside each heat receiving pipe 51, and is collected again in the high-temperature header 53.

As shown in FIG. 6, the respective heat receiving pipes 51 are arranged in parallel at a predetermined pipe pitch (arrangement pitch) P with a gap between the adjacent heat receiving pipes 51 in the circumferential direction of the heat receiver body 41. Furthermore, the pipe pitch P indicates a distance between the center axes (for example, O1 and O2) of the adjacent heat receiving pipes 51 in the circumferential direction of the heat receiver body 41. Then, in the outer peripheral surface of the heat receiving pipe 51, the area (at the front side of the irradiation direction of the sunlight H) of about 180° facing the inside in the radial direction of the heat receiver body 41 forms a light receiving surface (an irradiation side) 51a which can directly receive the sunlight H while facing the irradiation direction of the sunlight H collected from the opening portion 44. On the other hand, the area (at the back of the irradiation direction of the sunlight H) of about 180° facing the outside in the radial direction of the heat receiving pipe 51 forms a non-light receiving surface (a non-irradiation side) 51b which cannot directly receive the sunlight H while facing the heat insulating material 47.

Figure 8:
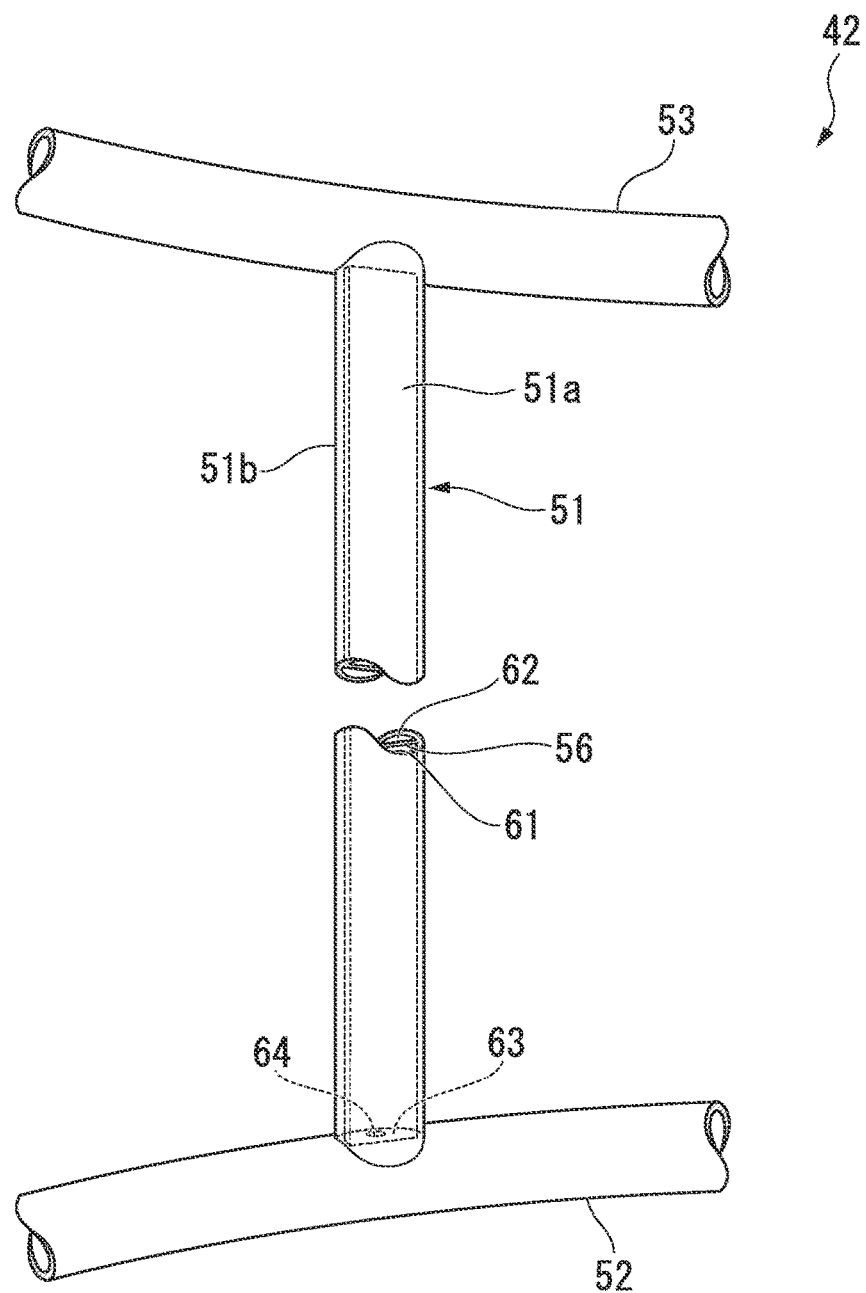
FIG. 8 is an enlarged perspective view of a heat receiving unit.

FIG. 8 is an enlarged perspective view of the heat receiving unit.

Here, as shown in FIGS. 6 to 8, the inside of each heat receiving pipe 51 is provided with a partition plate 56 which defines the light receiving surface 51a and the non-light receiving surface 51b. The partition plate 56 is formed in a flat plate shape so as to be integrated with the heat receiving pipe 51 by a welding process, a drawing process, or the like, and is formed in the entire length of the heat receiving pipe 51 in the axial direction. Accordingly, the heat receiving pipe 51 is divided into a light receiving side passageway (a first passageway) 61 which is surrounded by the light receiving surface 51a and the partition plate 56 and a non-light receiving side passageway (a second passageway) 62 which is surrounded by the non-light receiving surface 51b and the partition plate 56.

Further, the upstream of the non-light receiving side passageway 62, that is, the inlet from the low-temperature header 52 in the non-light receiving side passageway 62 is provided with an orifice plate (constraint means) 63 which blocks the inlet of the non-light receiving side passageway 62. The orifice plate 63 is provided with an orifice hole 64 which penetrates in the thickness direction, whereby the flow rate of the compressed air flowing into the non-light receiving side passageway 62 is constrained compared to the flow rate of the compressed air flowing into the light receiving side passageway 61.

(Method of Operating Power Generating Equipment)

Next, a method of operating the above-described power generating equipment will be described.

First, as shown in FIG. 3B, when the generator 28 is operated so that the rotor 30 starts to rotate through the speed reducer 31, air which is accumulated in the supply source flows into the air supply path 35 from the air intake port 29, and flows into the compressor 23 through the air intake filter 26. The air which flows into the compressor 23 is compressed inside the compressor 23, and flows to the heat receiver supply path 32 in the form of compressed air. The compressed air is supplied from the heat receiver supply path 32 into the low-temperature header 52 of the heat receiving unit 42 (see the arrow F1 of FIG. 4).

As shown in FIG. 4, the compressed air which is supplied into the low-temperature header 52 widely spreads in the entire area of the low-temperature header 52 in the circumferential direction, and flows into each of the heat receiving pipes 51 which are connected to the low-temperature header 52 in the entire area in the circumferential direction.

On the other hand, the sunlight H which are incident to the heliostats 2 are reflected in the heliostats 2, and are incident to the heat receiver body 41 from the opening portion 44 of the heat receiver body 41. In the sunlight H which are incident to the heat receiver body 41, the sunlight H which are received in the light receiving surface 51a of the heat receiving pipe 51 change into thermal energy that directly heats the heat receiving pipe 51. Specifically, as shown in FIG. 1, the sunlight H from the heliostat 2 which is the closest to the light collecting heat receiver 10 are irradiated to the upper portion (the downstream) of the heat receiving pipe 51. Further, the sunlight H from the heliostat 2 which is the farthest from the light collecting heat receiver 10 is irradiated to the lower portion (the upstream) of the heat receiving pipe 51.

Then, a heat exchange is performed between the heat receiving pipe 51 and the compressed air flowing inside the heat receiving pipe 51, and the temperature of the compressed air becomes high while it flows inside the heat receiving pipe 51.

Here, as described above, since the sunlight H which are incident to the heat receiver body 41 are received in the light receiving surface 51a of the heat receiving pipe 51, the light receiving side passageway 61 becomes hotter than the non-light receiving side passageway 62. Then, the compressed air which flows from the low-temperature header 52 into the heat receiving pipe 51 is branched from the inlet of the heat receiving pipe 51 into the light receiving side passageway 61 and the non-light receiving side passageway 62. At this time, in the non-light receiving side passageway 62, the flow rate of the compressed air which flows into the passageway is constrained by the orifice hole 64. For this reason, the flow rate of the compressed air which flows into the light receiving side passageway 61 becomes larger than the flow rate of the compressed air which flows into the non-light receiving side passageway 62. That is, the compressed air which is more than that of the low-temperature non-light receiving side passageway 62 cooler than the light receiving side passageway 61 is supplied to the high-temperature light receiving side passageway 61.

For this reason, the efficiency of the heat transfer from the light receiving side passageway 61 to the compressed air becomes higher than the efficiency of the heat transfer from the non-light receiving side passageway 62 to the compressed air. That is, when the heat transfer from the light receiving side passageway 61 to the compressed air is more actively performed than the heat transfer from the non-light receiving side passageway 62 to the compressed air, a decrease in temperature of the light receiving side passageway 61 may be suppressed compared to a decrease in temperature of the non-light receiving side passageway 62 due to the heat transfer to the compressed air.

Then, the compressed air which becomes a high temperature while flowing inside the light receiving side passageway 61 and the non-light receiving side passageway 62 flows from the downstream end of the heat receiving pipe 51 into the high-temperature header 53. That is, the compressed air which is heated in each heat receiving pipe 51 is collected inside the high-temperature header 53 and flows into the turbine supply path 33 through the outflow pipe 55.

The compressed air which flows into the turbine supply path 33 flows inside the turbine supply path 33 upward in the perpendicular direction (see the arrow F2 of FIG. 4), and flows into the turbine 24 so as to drive the turbine 24. Accordingly, the thermal energy of the compressed air which is supplied from the turbine supply path 33 is converted into rotation energy of the rotor 30, and generates a driving force in the turbine 24. Then, the driving force is output to the generator 28 which is connected to the rotor 30, thereby generating electric power.

The compressed air which flows inside the turbine 24 changes into an exhaust gas, and is discharged from the turbine 24 through the air discharge path 34. The exhaust gas which flows inside the air discharge path 34 is supplied into the regenerative heat exchanger 27, and is discharged to the outside after performing a heat exchange with the compressed air which flows from the above-described compressor 23 toward the heat receiving unit 42. In this way, in the regenerative heat exchanger 27, when the compressed air which flows from the compressor 23 toward the heat receiving unit 42 is pre-heated at the front stage where the compressed air is supplied to the heat receiving unit 42, the temperature of the compressed air which is supplied to the turbine 24 may be set to a high temperature. As a result, it is possible to further improve the power generating efficiency of the power generating equipment 100. Furthermore, in the regenerative heat exchanger 27, the exhaust gas supplied for generating electric power in the turbine 24 may be effectively used. Accordingly, it is possible to simplify the configuration and reduce the cost of facilities without preparing other heat sources.

In this way, in the embodiment, a configuration is adopted in which the partition plate 56 is provided so as to divide the side of the light receiving surface 51a and the side of the non-light receiving surface 51b in the heat receiving pipe 51, and the orifice plate 63 is disposed so as to constrain the compressed air flowing into the non-light receiving side passageway 62.

With this configuration, since it is possible to reduce the temperature difference between the light receiving surface 51a and the non-light receiving surface 51b as described above by actively performing a heat exchange of the light receiving side passageway 61 with the compressed air more than a heat exchange of the non-light receiving side passageway 62 with the compressed air, it is possible to reduce thermal stress caused by the temperature difference between both surfaces. Accordingly, since it is possible to suppress a reducing of the working life caused by the fatigue due to the concentration and the repetition of the stress exerted on the heat receiving pipe 51 or the bonding portions between the heat receiving pipe 51 and the headers 52 and 53, it is possible to improve the durability of the heat receiving pipe 51. As a result, since it is possible to extend the maintenance cycle or the replacement of the heat receiving pipe 51 by extending the life of the heat receiving pipe 51, it is possible to reduce the cost of facilities. Accordingly, it is possible to increase the power generating amount with respect to the cost of facilities and improve the power generating efficiency.

Then, in such a light collecting heat receiving system 101, it is possible to reduce the temperature difference between the light receiving side passageway 61 and the non-light receiving side passageway 62 and efficiently transfer the thermal energy from the sunlight H to the compressed air.

Furthermore, in the sunlight H which are incident to the heat receiver body 41, the sunlight H which pass between the respective heat receiving pipes 51 are irradiated to the inner surface of the heat insulating material 47 so that it changes into thermal energy inside the heat receiver body 41. In this case, since the inner surface of the heat receiver body 41 is insulated from heat by the heat insulating material 47 and the surface of the heat insulating material 47 is coated with blackbody paint, the thermal energy which is generated inside the heat receiver body 41 is radiated to the inside of the heat receiver body 41 without being transferred to the wall surface of the heat receiver body 41. For this reason, the thermal energy which is radiated to the heat receiver body 41 is transferred to the non-light receiving surface 51b in the heat receiving pipe 51 so as to heat the heat receiving pipe 51. Further, the thermal energy which is obtained by the heat receiving pipe 51 is radiated to the inside of the heat receiving pipe 51, and is also radiated to the outside (the inside of the heat receiver body 41) of the heat receiving pipe 51. Even in this case, since the inner wall surface of the heat receiver body 41 is provided with the heat insulating material 47, thermal energy is accumulated inside the heat receiver body 41. Then, the accumulated thermal energy is radiated to the heat receiving pipe 51.

Accordingly, since it is possible to heat the entire area of the heat receiving pipe 51 in the circumferential direction, it is possible to more effectively reduce the temperature difference between the light receiving surface 51a and the non-light receiving surface 51b.

Second Embodiment

Figure 9:
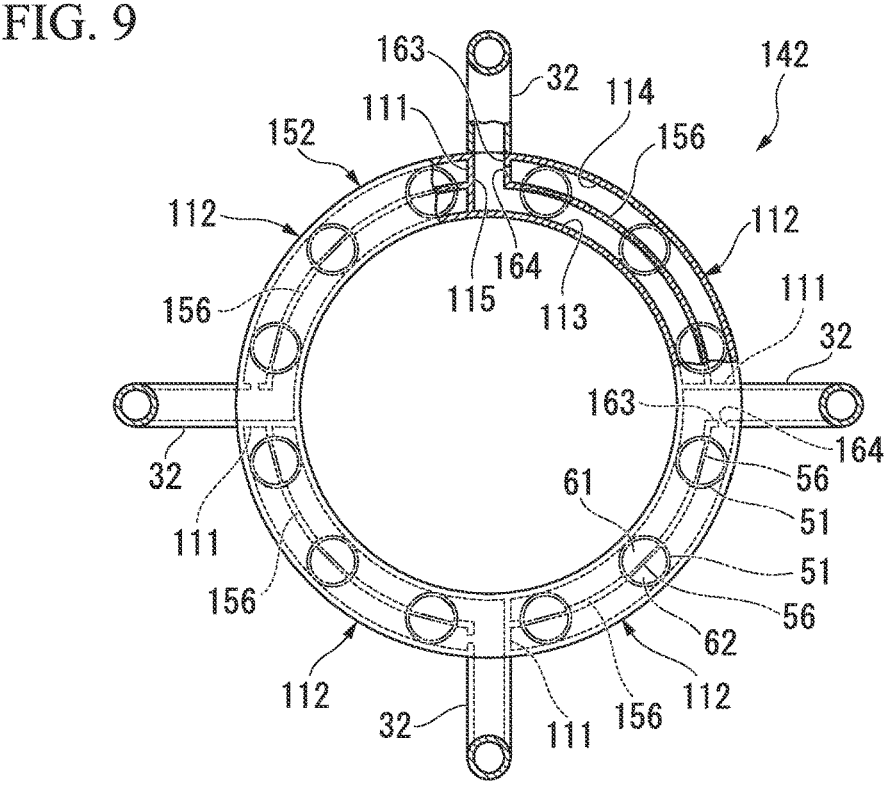
FIG. 9 is a partially cutaway plan view showing a heat receiving unit of a second embodiment.

Next, a second embodiment of the invention will be described. FIG. 9 is a partially cutaway plan view showing a heat receiving unit of the embodiment. In the above-described embodiment, a configuration has been described in which the orifice plate 63 as the constraint means is disposed in the inlet of the non-light receiving side passageway 62 of each heat receiving pipe 51, but this embodiment is different from the above-described embodiment in that the constraint means is disposed in the low-temperature header 52. Furthermore, in the description below, the same reference signs will be given to the same components and the description thereof will be omitted.

As shown in FIG. 9, a heat receiving unit 142 of the embodiment has a configuration in which a plurality of partition walls 111 is provided at the same interval in the circumferential direction of the low-temperature header 152. Each partition wall 111 is disposed at one end of the outlet of each heat receiver supply path 32 in the low-temperature header 152, and an area surrounded by the partition walls 111 forms a segmented header 112. That is, the respective segmented headers 112 segment the low-temperature header 152 every 90°, and the outlet of the heat receiver supply path 32 is opened at one end of each segmented header 112 in the circumferential direction.

Here, a partition plate (a partition member) 156 is provided in each segmented header 112 so as to divide and halve the low-temperature header 152 in the radial direction into the inside and the outside. The partition plate 156 is a substantially circular-arc shaped member which extends from the partition wall 111 of the downstream (the other end of the circumferential direction) of the segmented header 112 toward the partition wall 111 of the upstream (one end of the circumferential direction) in the plan view (when seen from the axial direction of the low-temperature header 152). Accordingly, the segmented header 112 is divided into a light receiving side header (a first header) 113 which is surrounded by the partition plate 156 at the inside of the low-temperature header 152 in the radial direction and a non-light receiving side header 114 which is surrounded by the partition plate 156 at the outside of the low-temperature header 152 in the radial direction.

Furthermore, in each segmented header 112, the downstream end of the partition plate 156 is connected to the partition wall 111 at the downstream, and the upstream end of the partition plate 156 is not connected to the partition wall 111 at the upstream. That is, a common passageway 115 into which the compressed air flows from the heat receiver supply path 32 is formed between the upstream end of the partition plate 156 and the partition wall 111 at the upstream. For this reason, the compressed air which flows from the heat receiver supply path 32 into each segmented header 112 flows inside the common passageway 115, and is branched into the light receiving side header 113 and the non-light receiving side header 114 respectively.

Each partition plate 156 is disposed so as to overlap the partition plate 56 of the above-described heat receiving pipe 51 when seen from the axial direction of the low-temperature header 152. In this case, the light receiving side header 113 of the segmented header 112 communicates with the light receiving side passageway 61 of the heat receiving pipe 51, and the non-light receiving side header 114 of the segmented header 112 communicates with the non-light receiving side passageway 62 of the heat receiving pipe 51.

Further, the orifice plate 163 is provided in the inlet of the non-light receiving side header 114 so as to narrow the inlet. An orifice hole 164 is formed in the orifice plate 163 so as to penetrate the orifice plate in the thickness direction. Accordingly, the flow rate of the compressed air which flows into the non-light receiving side header 114 is constrained compared to the flow rate of the compressed air which flows into the light receiving side header 113.

According to the embodiment, since the low-temperature header 152 is divided into the light receiving side header 113 and the non-light receiving side header 114 and the non-light receiving side header 114 is provided with the orifice plate 163, it is possible to simultaneously constrain the flow rate with respect to the non-light receiving side passageways 62 of the plurality of heat receiving pipes 51. Accordingly, it is possible to obtain the same advantage as that of the first embodiment and reduce the cost of facilities compared to the case where the orifice plate 63 (see FIG. 8) is provided for each heat receiving pipe 51.

Third Embodiment

Figure 10:
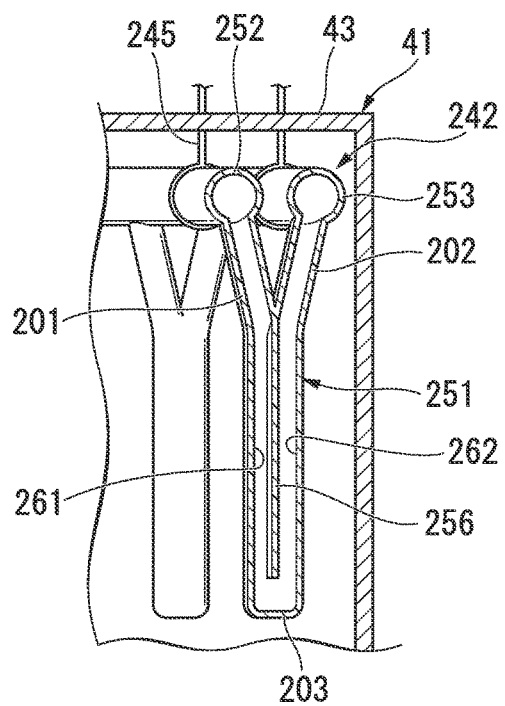
FIG. 10 is a cross-sectional view showing a heat receiving unit of a third embodiment.

Next, a third embodiment of the invention will be described. FIG. 10 is a cross-sectional view showing a heat receiving unit of the embodiment. Furthermore, in the description below, the same reference signs will be given to the same components and the description thereof will be omitted.

As shown in FIG. 10, inside the heat receiver body 41a heat receiving unit 242 of the embodiment includes a high-temperature header 253 which is disposed along the outer periphery of the ceiling plate portion 43, a low-temperature header 252 which is disposed at the inside of the high-temperature header 253 in the radial direction, and a plurality of heat receiving pipes 251 which makes the headers 252 and 253 communicate with each other. Furthermore, the low-temperature header 252 and the high-temperature header 253 are supported while being hung on the ceiling plate portion 43 by a plurality of hook members 245.

In each heat receiving pipe 251, one pipe is divided into a light receiving side passageway 261 and a non-light receiving side passageway 262 by a partition plate 256. Branch pipes 201 and 202 are respectively connected to the opening portions of one end (upper ends) of the light receiving side passageway 261 and the non-light receiving side passageway 262 so as to extend in a fork shape, and a reverse passageway 203 is connected to the opening portions of the other end so as to make the opening portions communicate with each other, so that each heat receiving pipe 251 is formed in a Y-shape. Then, in each heat receiving pipe 251, the branch pipe 201 of the light receiving side passageway 261 is connected to the low-temperature header 252, and the branch pipe 202 of the non-light receiving side passageway 262 is connected to the high-temperature header 253. That is, each heat receiving pipe 251 is disposed so as to be supported while being hung on the low-temperature header 252 and the high-temperature header 253. In this case, the compressed air which flows inside the low-temperature header 252 flows from the branch pipe 201 into the light receiving side passageway 261, is reversed in the reverse passageway 203, flows inside the non-light receiving side passageway 262, and then flows from the branch pipe 202 into the high-temperature header 253.

According to the embodiment, since the low-temperature header 252 is connected to the light receiving side passageway 261 and the high-temperature header 253 is connected to the non-light receiving side passageway 262, the compressed air flows into the light receiving side passageway 261 and is discharged from the non-light receiving side passageway 262. For this reason, comparatively low-temperature compressed air which is supplied from the low-temperature header 252 flows inside the light receiving side passageway 261, and comparatively high-temperature compressed air which is subjected to a heat exchange in the light receiving side passageway 261 flows inside the non-light receiving side passageway 262. That is, the temperature difference between the light receiving side passageway 261 and the compressed air becomes larger than the temperature difference between the non-light receiving side passageway 262 and the compressed air. For this reason, the heat transfer from the light receiving side passageway 261 to the compressed air is more actively performed than the heat transfer from the non-light receiving side passageway 262 to the compressed air. As a result, it is possible to reduce the temperature difference between the light receiving side passageway 261 and the non-light receiving side passageway 262.

Further, since only the upper end of the heat receiving pipe 251 is connected to the low-temperature header 252 and the high-temperature header 253, the lower end is not confined so that it is formed as a free end. For this reason, even when the heat receiving pipe 251 is deformed by a change in temperature, the deformation is permitted, so that thermal stress exerted on the heat receiving pipe 251 may be reduced.

Furthermore, since the headers 252 and 253 are both disposed at the upper end of the heat receiver body 41, there is no need to pull the compressed air to the lower end of the heat receiver body 41 in order to supply the compressed air compressed in the compressor 23 to the low-temperature header 52 as in the above-described first embodiment. For this reason, it is possible to improve the layout of the device.

Fourth Embodiment

Figure 11A:
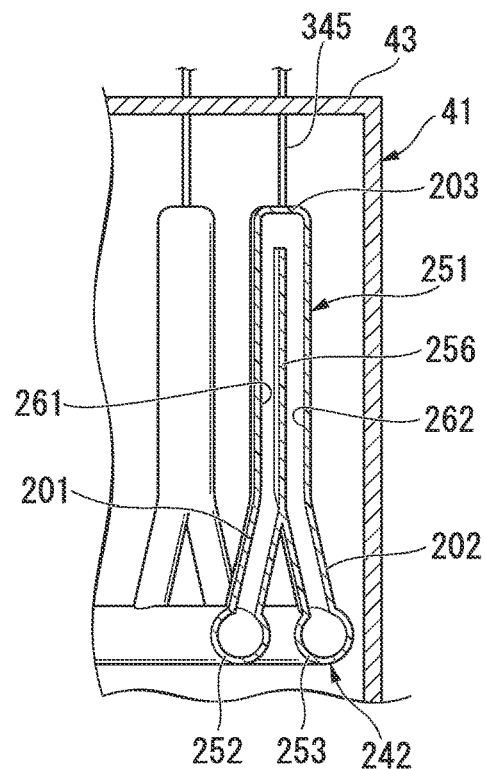
FIG. 11A is a cross-sectional view showing a heat receiving unit of a fourth embodiment.
Figure 11B:
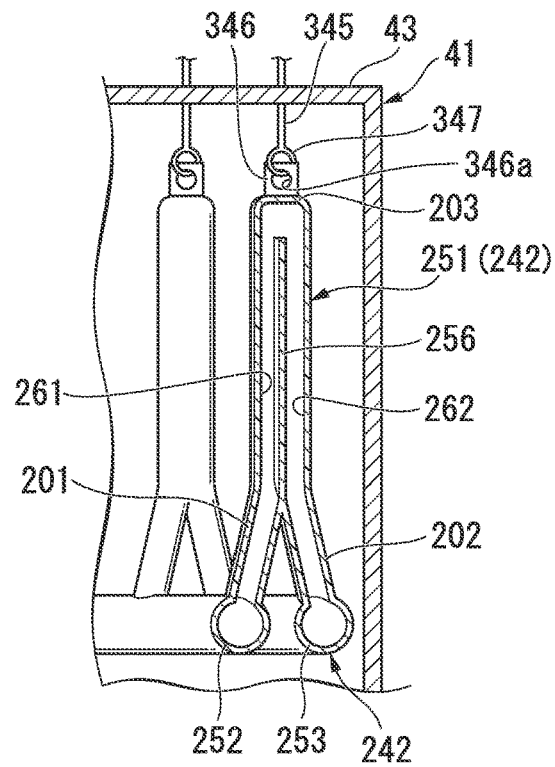
FIG. 11B is a cross-sectional view showing the heat receiving unit of the fourth embodiment.

Next, a fourth embodiment of the invention will be described. FIGS. 11A and 11B are cross-sectional views showing a heat receiving unit of the embodiment. In the embodiment, the arrangement direction of the heat receiving pipes 251 is reversed in the up-down direction compared to the third embodiment. Furthermore, in the description below, the same reference signs will be given to the same components and the description thereof will be omitted.

As shown in FIG. 11A, in the heat receiving unit 242 of the embodiment, the low-temperature header 252 and the high-temperature header 253 are disposed at the lower portion in the gravity direction inside the heat receiver body 41, and the plurality of heat receiving pipes 251 extends upward from the low-temperature header 252 and the high-temperature header 253.

Further, the ceiling plate portion 43 inside the heat receiver body 41 is provided with a plurality of hook members 345 which connects the ceiling plate portion 43 to the upper end surfaces of the respective heat receiving pipes 251, so that the heat receiving unit 242 is supported inside the heat receiver body 41 while being hung thereon.

In this way, according to the embodiment, even when the heat receiving pipes 251 are arranged in the opposite direction to that of the third embodiment in the up-down direction, the same effect as that of the above-described third embodiment may be obtained. Furthermore, the structure of hanging the heat receiving unit 242 may be, for example, the structure shown in FIG. 11B other than the above-described structure. Specifically, the upper end surface of each heat receiving pipe 251 is provided with a connection member 346 having a penetration hole 346a, and the front end (the lower end) of the hook member 345 is provided with a ring portion 347 inserted into the penetration hole 346, so that the connection member 346 and the ring portion 347 are connected to each other. Accordingly, the heat receiving unit 242 is supported by the heat receiver body 41 while being hung therein by the hook members 345.

Fifth Embodiment

Figure 12:
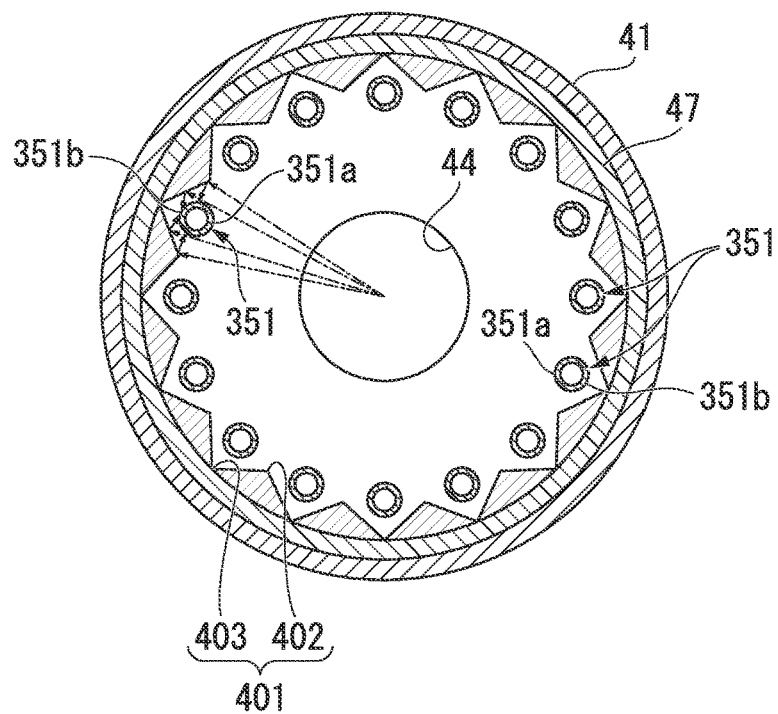
FIG. 12 is a cross-sectional view showing a light collecting heat receiver of a fifth embodiment when seen from the axial direction.

Next, a fifth embodiment of the invention will be described. FIG. 12 is a cross-sectional view showing a light collecting heat receiver in the axial direction. This embodiment is different from the above-described embodiments in that the reflection mirror is disposed in the inner wall surface of the heat receiver body. Furthermore, in the description below, the same reference signs will be given to the same components and the description thereof will be omitted.

As shown in FIG. 12, reflection mirrors 401 are arranged on the inner wall surface of the heat receiver body 41 throughout the entire circumference thereof. The reflection mirrors 401 have a wavy cross-section in which peak portions 402 and valley portion 403 are continuously formed in the circumferential direction of the heat receiver body 41, and the heat receiving pipe 351 is disposed between the respective peak portions 403. In this case, a part of the sunlight H which are incident into the heat receiver body 41 are directly irradiated to the light receiving surface 351a of the heat receiving pipe 351. On the other hand, in the sunlight H in which are incident into the heat receiver body 41, the sunlight H which pass between the heat receiving pipes 351 are reflected in the reflection mirrors 401 provided in the inner wall surface of the heat receiver body 41, and are irradiated to a non-light receiving surface 351b which cannot directly receive the sunlight H incident from the opening portion 44.

Accordingly, since the sunlight H may be actively irradiated to the non-light receiving surface 351b of the heat receiving pipe 351, it is possible to reduce the temperature difference between the light receiving surface 351a and the non-light receiving surface 351b by heating the entire area of the heat receiving pipe 51 in the circumferential direction.

Furthermore, in the above-described fifth embodiment, the heat receiving pipe 351 which is not divided by the partition plate (for example, the partition plate 56) unlike the first to fourth embodiments is described. However, the heat receiving pipes 51, 151, and 251 with the partition plates of the first to fourth embodiments may be used. Accordingly, it is possible to further reduce the temperature difference between the light receiving surface 351a and the non-light receiving surface 351b. Further, the reflection mirror 401 may be formed in a concave shape. Further, the arrangement pitch of the reflection mirrors 401 does not need to match the arrangement pitch of the heat receiving pipes 351.

Furthermore, the technical scope of the invention is not limited to the above-described embodiments, and includes various modifications of the above-described embodiments within the scope without departing from the spirit of the invention. That is, the specific structure or shape of the embodiments is merely an example, and may be appropriately modified.

For example, in the above-described embodiments, a case has been described in which the compressed air heated in the light collecting heat receiver 10 is supplied as a hydraulic fluid to the turbine 24, but the invention is not limited thereto. A configuration may be adopted in which a hydraulic fluid (for example, combusted gas) is separately supplied to the turbine 24 and the compressed air heated in the heat receiving unit 42 is used for the heat exchange of the hydraulic fluid.

Further, the positional relation between the light collecting heat receiver and the power generating unit may be appropriately changed. That is, the arrangement position of the power generating unit is not limited to the upside or the downside of the light collecting heat receiver.

Furthermore, in the above-described embodiment, a case has been described in which the generator 28 serves as an alternator that drives the rotor 30 and rotates the turbine 24 so as to generate electric power, but the invention is not limited thereto. A driving motor which rotates the rotor 30 separately from the generator 28 may be adopted.

However, in the power generating equipment 100, there is a tendency that the light collecting efficiency of the sunlight in a part of an orientation (for example, the south in the case of the Northern Hemisphere) decreases due to a relationship in which the solar altitude becomes lower as the installation location becomes closer to the high-latitude region. For this reason, in the above-described embodiments, the entire circumference arrangement type power generating equipment 100 disposed in the low-latitude region in the subtropical high-pressure belt has been described, but the invention is not limited thereto. Then, a one-side arrangement type may be adopted in which the heliostats 2 are disposed at one side of the power generating equipment 100. In this case, in the one-side arrangement type power generating equipment, the heat receiver body is formed as a semi-circular shape and the heat receiving pipes are arranged in accordance with the circular-arc shape. Then, it is desirable to separately use the entire circumference arrangement type power generating equipment 100 and the one-side arrangement type power generating equipment in accordance with the solar altitude in the low-latitude region and the high-latitude region.

Figure 13:
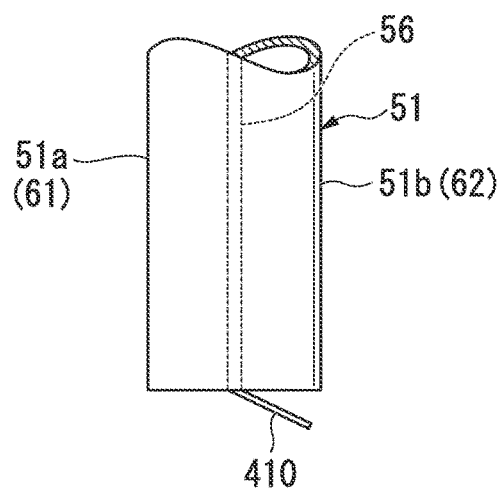
FIG. 13 is a perspective view of a heat receiving pipe showing another configuration of constraint means.

Further, in the above-described embodiments, a case has been described in which the orifice plate 63 is adopted as the constraint means for constraining the flow rate of the compressed air flowing inside the non-light receiving side passageway 62, but the invention is not limited thereto. For example, as shown in FIG. 13, a guide vane 410 may be provided so as to cover part of the inlet in the non-light receiving side passageway 62. Furthermore, the guide vane 410 may be configured to be movable, and the opening width of the inlet of the non-light receiving side passageway 62 may be changed based on the amount of solar radiation of the sunlight H. In this case, the opening width of the heat receiving pipe 51 may be changed by a plurality of vanes like an air-conditioning damper.

Figure 14:
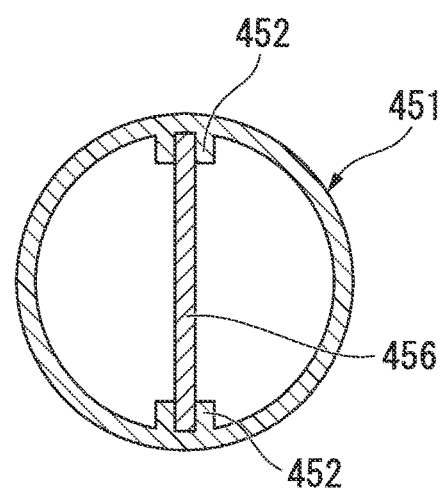
FIG. 14 is a perspective view of the heat receiving pipe showing another configuration of a heat receiving pipe.
Figure 15:
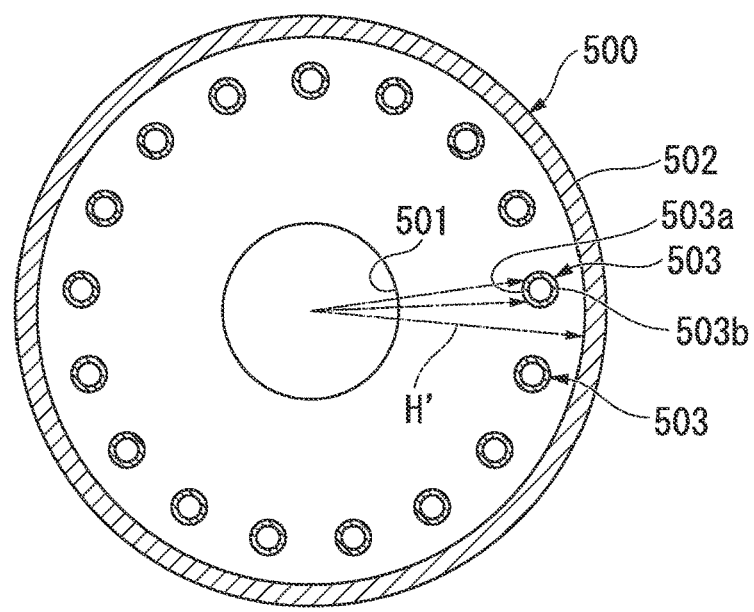
FIG. 15 is a cross-sectional view showing a light collecting heat receiver of the related art when seen from the axial direction.

Furthermore, in the above-described embodiment, a case has been described in which the partition plate 56 is integrated by welding, drawing, or the like. For example, as shown in FIG. 14, a configuration may be adopted in which ribs 452 are provided in the inner peripheral surface of the heat receiving pipe 451 so as to protrude inward in the radial direction and a partition plate 456 is inserted between the ribs 452. In this case, the heat receiving pipe 451 and the partition plate 456 may be formed of a different type of material.

Further, in the first and second embodiments and the fifth embodiment described above, a case has been described in which the partition plate 56 is provided in the entire area of the heat receiving pipe 51 in the axial direction. However, only part of the heat receiving pipe 51 in the axial direction may be divided by the partition plate 56. In this case, in the light collecting heat receiving system 101, the number of the heliostats 2 increases as it moves to the outer periphery of the heliostat field 1. For this reason, the incident amount of the sunlight H incident into the opening portion 44 of the heat receiver body 41 increases as it moves from the inner periphery of the heliostat field 1 toward the outer periphery thereof. For this reason, the light receiving amount of the heat receiving pipe 51 is larger at the lower portion in the axial direction compared to the upper portion, so that the temperature difference between the light receiving surface 51a and the non-light receiving surface 51b at the lower portion of the heat receiving pipe 51 increases. Therefore, it is desirable that only the lower portion of the heat receiving pipe 51 be divided into the light receiving side passageway 61 and the non-light receiving side passageway 62 and the upper portion of the heat receiving pipe 51 be formed as a collection pipe of the light receiving side passageway 61 and the non-light receiving side passageway 62.

Further, in the above-described second embodiment, the flow rate of the compressed air which flows into the light receiving side passageway 61 and the non-light receiving side passageway 62 is constrained by the low-temperature header 152, but may be collected and constrained at the upstream of the low-temperature header 152. In this case, when the compressed air is branched into the light receiving side supply passageway which supplies the compressed air to the light receiving side passageway 61 and the non-light receiving side supply passageway which supplies the compressed air to the non-light receiving side passageway 62, and the flow rate control valve is provided in the non-light receiving side supply passageway, the flow rate of the compressed air which is supplied to the light receiving side passageway 61 and the non-light receiving side passageway 62 may be adjusted at the front stage where the compressed air is supplied to the low-temperature header 152.

INDUSTRIAL APPLICABILITY

According to the sunlight collecting heat receiver of the invention, it is possible to improve the durability of the heat receiving pipe by reducing the temperature difference between the light receiving surface (the irradiation side) and the non-light receiving surface (the non-irradiation side) in the heat receiving pipe.

Further, according to the sunlight collecting heat receiving system of the invention, since the sunlight collecting heat receiver of the invention is provided, it is possible to reduce the temperature difference between the light receiving surface (the irradiation side) and the non-light receiving surface (the non-irradiation side) and efficiently transfer the thermal energy from the sunlight to the heat medium.

REFERENCE SIGNS LIST

2: HELIOSTAT
3: TOWER PORTION
10: LIGHT COLLECTING HEAT RECEIVER (SUNLIGHT COLLECTING HEAT RECEIVER)
41: HEAT RECEIVER BODY (CASING)
44: OPENING PORTION
51, 151, 251, 351, 451: HEAT RECEIVING PIPE
51a, 351a: LIGHT RECEIVING SURFACE (IRRADIATION SIDE)
51b, 351b: NON-LIGHT RECEIVING SURFACE (NON-IRRADIATION SIDE)
52, 152, 252: LOW-TEMPERATURE HEADER (HEAT MEDIUM INTRODUCTION HEADER)
53, 253: HIGH-TEMPERATURE HEADER (HEAT MEDIUM REMOVAL HEADER)
56, 156, 256, 456: PARTITION PLATE (PARTITION MEMBER)
61, 261: LIGHT RECEIVING SIDE PASSAGEWAY (FIRST PASSAGEWAY)
62, 262: NON-LIGHT RECEIVING SIDE PASSAGEWAY (SECOND PASSAGEWAY)
63, 163: ORIFICE PLATE (CONSTRAINT MEANS)
113: LIGHT RECEIVING SIDE HEADER (FIRST HEADER)
114: NON-LIGHT RECEIVING SIDE HEADER (SECOND HEADER)

The invention claimed is:

1. A sunlight collecting heat receiver comprising:
a heat receiver body which is formed as a casing, the heat receiver body having an opening portion and a tapered portion, the tapered portion being formed at a lower portion of the heat receiver body so that an inner diameter of the heat receiver body gradually decreases in a direction toward the opening portion;
a housing which accommodates the heat receiver body therein;
a plurality of heat receiving pipes, each of which has: a lower end penetrating through the tapered portion; and an upper located inside the heat receiver body provided inside the heat receiver body, each heat receiving pipe being parallel to an axial direction of the sunlight collecting heat receiver, each heat receiving pipe having a passageway in which a heat medium flows, each heat receiving pipe transferring heat of irradiated sunlight to the heat medium;
a heat medium introduction header which is an endless annular member that does not have ends in a circumferential direction and is around the axial direction, which allows the heat medium to flow inside the heat medium introduction header in the circumferential direction of the heat medium introduction header, which disperses the heat medium flowing inside the heat medium introduction header to each heat receiving pipe, to which upstream ends of the plurality of heat receiving pipes in a flowing direction of the heat medium are integrally connected, the heat medium introduction header being disposed outside the tapered portion of the heat receiver body so as to surround the tapered portion;

a heat medium removal header which is an endless annular member that does not have ends in a circumferential direction and is around the axial direction, which collects the heat medium in the heat medium removal header, which allows the heat medium to flow inside the heat medium removal header in the circumferential direction of the heat medium removal header, to which downstream ends of the plurality of heat receiving pipes in the flowing direction of the heat medium are integrally connected;

heat receiver supply pipes, each of which has a connection portion and a curved portion and which extends in a radial-outer direction of the heat medium introduction header, the connection portion being connected to the heat medium introduction header, the curved portion being provided outside the heat receiver body and between the housing and the heat receiver body;

a partition member which divides the inside of the heat receiving pipe into a first passageway near a light receiving surface irradiated with the sunlight and a second passageway near a non-light receiving surface; and an orifice plate which is provided at an inlet of the second passageway and constrains the heat medium from flowing into the second passageway so as to block the inlet, the orifice plate having an orifice hole, the orifice hole penetrating the orifice plate in a thickness direction thereof.

2. A sunlight collecting heat receiver comprising:

a heat receiver body which is formed as a casing, the heat receiver body having an opening portion and a tapered portion, the tapered portion being formed at a lower portion of the heat receiver body so that an inner diameter of the heat receiver body gradually decreases in a direction toward the opening portion;

a housing which accommodates the heat receiver body therein;

a plurality of heat receiving pipes, each of which has: a lower end penetrating through the tapered portion; and an upper located inside the heat receiver body provided inside the heat receiver body, each heat receiving pipe being parallel to an axial direction of the sunlight collecting heat receiver, each heat receiving pipe having a passageway in which a heat medium flows, each heat receiving pipe transferring heat of irradiated sunlight to the heat medium;

a partition member which divides the inside of each heat receiving pipe into a first passageway near a light receiving surface irradiated with the sunlight and a second passageway near a non-light receiving surface;

a heat medium introduction header assembly, which is an endless annular member that does not have ends in a circumferential direction and is around the axial direction, which allows the heat medium to flow inside the heat medium introduction header assembly in the circumferential direction of the heat medium introduction header assembly, to which upstream ends of the plurality of heat receiving pipes in the heat medium flowing direction are connected and which introduces the heat medium toward the plurality of heat receiving pipes, the heat medium introduction header assembly being disposed outside the tapered portion of the heat receiver body so as to surround the tapered portion; and heat receiver supply pipes, each of which has a connection portion and a curved portion and which extends in a radial-outer direction of the heat medium introduction header assembly, the connection portion being connected to the heat medium introduction header assembly, the curved portion being provided outside the heat receiver body and between the housing and the heat receiver body, wherein the heat medium introduction header assembly includes:

a partition plate which divides and halves the heat medium introduction header assembly in the radial direction into the inside and the outside;

a first header formed by the partition plate at the inside of the heat medium introduction header assembly in the radial direction, the first header communicating with the first passageway of the heat receiving pipe;

a second header formed by the partition plate at the outside of the heat medium introduction header assembly in the radial direction, the second header communicating with the second passageway of the heat receiving pipe; and an orifice plate which is provided at an inlet of the second header so as to narrow the inlet, the orifice plate having an orifice hole, the orifice hole penetrating the orifice plate in a thickness direction thereof.

3. The sunlight collecting heat receiver according to claim 1, wherein the first passageway and the second passageway communicate with each other in one end of the heat medium flowing direction, and wherein the heat medium is supplied from the other end of the first passageway in the flowing direction and is discharged from the other end of the second passageway in the flowing direction.

4. The sunlight collecting heat receiver according to claim 3, further comprising:

a plurality of the heat receiving pipes;

a heat medium introduction header to which the other ends of the first passageways of the plurality of heat receiving pipes in the flowing direction are connected and which introduces the heat medium toward the first passageways; and a heat medium removal header to which the other ends of the second passageways in the flowing direction are connected and which derives the heat medium from the second passageways.

5. A sunlight collecting heat receiving system comprising:

a plurality of reflection mirrors which is installed on a ground and reflects sunlight;

a tower portion which is built on the ground;

a casing which is supported by the tower portion and has an opening portion used for collecting the sunlight; and the sunlight collecting heat receiver according to claim 1 which is received inside the casing.

6. A sunlight collecting heat receiving system comprising:

a plurality of reflection mirrors which is installed on a ground and reflects sunlight;

a tower portion which is built on the ground;

a casing which is supported by the tower portion and has an opening portion used for collecting the sunlight; and the sunlight collecting heat receiver according to claim 2 which is received inside the casing.

7. A sunlight collecting heat receiving system comprising:
a plurality of reflection mirrors which is installed on a ground and reflects sunlight;
a tower portion which is built on the ground;
a casing which is supported by the tower portion and has an opening portion used for collecting the sunlight; and
the sunlight collecting heat receiver according to claim 3 which is received inside the casing.

8. A sunlight collecting heat receiving system comprising:
a plurality of reflection mirrors which is installed on a ground and reflects sunlight;
a tower portion which is built on the ground;
a casing which is supported by the tower portion and has an opening portion used for collecting the sunlight; and
the sunlight collecting heat receiver according to claim 4 which is received inside the casing.

\* \* \* \* \*